3,110,606
PREPARATION OF CRYSTALLINE SILICIC
ACID PIGMENTS
Orlando Leonard Bertorelli, Borger, Tex., assignor to
J. M. Huber Corporation, Borger, Tex., a corporation
of New Jersey
No Drawing. Filed Aug. 9, 1947, Ser. No. 767,857
26 Claims. (Cl. 106—306)

This invention relates to the preparation of finely divided silicic acid pigments and, particularly, to silicic acid pigments which have novel properties and to novel methods of preparing such pigments. This application is a continuation-in-part of my copending application, Serial No. 688,685 filed August 6, 1946, now abandoned.

Free silicic acids and silica are well known materials which can be obtained by various methods, many of which are also well known. Free powdered silica can be obtained by grinding naturally occurring silica. Free silica can also be obtained in an extremely fine state of division by calcining kaolin followed by leaching of the alumina from the resulting silica by means of acid. Silicic acids are usually obtained by the decomposition of soluble silicates with acid. For example, ordinary water glass, on treatment with acid, will precipitate silicic acid as a gel which can be dried and ground. Finely divided silicic acid can also be obtained by dispersing a silicic acid gel in alcohol previous to drying.

Silicic acid and silica obtained by the prior methods have various objectionable properties, particularly when it is desired to employ them as pigments as in paints or the like, or as components of rubber compositions. For example, washed silica powder obtained as a by-product from alum manufacture retards the drying of linseed oil paints and rubber compositions containing it will not vulcanize. Also, such silica is objectionable for use in quality paper because of its sharp and gritty nature. The silicic acid powder obtained by grinding dried silicic acid gel does not develop good physical strength in rubber compounds and is a violent retarder of vulcanization. The silicic acid products obtained by treating an alkali silicate suspended in alcohol with acid are rather coarse and gritty in nature and are not in a satisfactory physical condition for incorporating into rubber, or for use as a pigment in many other compositions.

It is an object of the present invention to provide a novel method for preparing finely divided silicic acid pigments whereby the pigments are obtained as crystalline precipitates in a finely divided or powdery form that gives improved effects in rubber and for other uses, and that requires no grinding to prepare it for use. Another object of the invention is to provide a method for preparing silicic acid pigments which do not retard the vulcanization of rubber compositions but which impart beneficial properties to vulvanizable and vulcanized rubber compositions. A further object is to provide a process for preparing silicic acid pigments which have improved properties in paints and in paper coating compositions. A still further object is to provide a co-precipitation method for preparing pigment mixtures containing silicic acid, silica and certain metal salt pigments. Other objects are to provide new compositions of matter and to advance the art. Still other objects will appear hereinafter.

In accordance with my invention, an aqueous solution of an alkali metal silicate is first added slowly to an aqueous solution or slurry of a metal salt which is more soluble in water than the silicate of the metal component of the salt, until the amount of silicate added is at least approximately sufficient to convert all of the metal salt to the corresponding metal silicate. The metal salt solution is well agitated during the slow addition of the alkali metal silicate solution, so that a high concentration of silicate cannot occur in the reaction medium. The metal salt must be a salt of a metal from series 3 to 8 of group II of the periodic table, and the ratio of silica in the silicate to metal in the metal salt should be from about 1 to about 13 mols of the silica to one mol of the metal. When this ratio involves an excess of silicate over the amount sufficient to react with all of the metal salt, the excess can be added more rapidly than the primary addition.

The reaction of the silicate with the metal salt is carried out in the presence of enough water to form a slurry with the metal silicate, and I have found that the reaction occurring with slow addition of the silicate to the metal salt solution produces a precipitate in a very finely divided form which forms a slurry with the water. This precipitate can be but preferably is not separated.

Instead, to an aqueous slurry containing it, which preferably is the slurry resulting from the first reaction, there is next added, again in a gradual manner, a water soluble acid having a dissociation constant of at least $9.1 \times 10^{-8}$, until the amount of acid added is sufficient to decompose all the metal silicate contained in the slurry. The acid addition must bring the pH of the slurry to a value below 10, which can be as low as 2 but usually ranges from about 7 to about 8.5. The result of the reaction which then occurs is to decompose all the metal silicate in the slurry, whether it be precipitated metal silicate or an excess of soluble alkali metal silicate, or both, into crystalline or precipitated silicic acid; and a distinctly crystalline, non-gelatinous precipitate forms which consists of very finely divided, discrete particles of silicic acid or of a mixture of silicic acid and silica, together with like particles of an insoluble salt of the metal from the original metal salt in cases where the acid used forms a substantially insoluble salt with that metal.

The slow manner of mixing the metal salt and the alkali metal silicate solutions is an important requirement of the preferred manner of preparing a finely divided precipitated metal silicate to be decomposed according to the present invention. Silicates tend to produce non-crystalline, gelatinous precipitates, and this is particularly true of sodium silicates containing relatively high proportions of silica. Gelatinous precipitates are the usual result, and they occur when solutions of a metal salt and a silicate of the types specified are admixed rapidly, or when the metal salt solution is added to the silicate. I have found, on the other hand, that precipitates of a distinctly crystalline nature can be obtained if the alkali metal silicate is added slowly to the metal salt solution, with good agitation, until an amount has been added approximately sufficient to convert all of the metal salt to the corresponding metal silicate. After this slow addition and approximately complete conversion, an excess of alkali metal silicate can be added more rapidly, when desired, without changing the nature of the precipitates.

Having thus obtained a crystalline precipitated metal silicate from the first reaction, the second reaction or acidification phase of the process will yield a fine powdery precipitate composed of discrete crystalline particles. And since the acidification phase is continued until all the metal silicates in the slurry are decomposed, a product consisting substantially entirely of silicic acid and silica is obtained in cases where the acid used forms a water soluble salt with the metal from the original metal salt.

The time required for the slow addition of the alkali metal silicate solution to the solution or slurry of the metal salt varies with the nature of the particular substances used, but it should be at least 5 minutes in every case and usually need not exceed 30 minutes. In general, the time required for the addition of the soluble metal silicate can be decreased by increasing the temperature of the reactants. When the metal salt being used is calcium sulfate, for example, the time required is about 20 to 30 minutes.

The products resulting from the practice of this invention have novel properties whereby they are useful in applications where previous silicic acid and silica pigments were either not useful or had little utility. For example, the resulting pigments do not retard the vulcanization of otherwise vulcanizable rubber compositions but actually impart beneficial properties to the rubber, such as exceptionally good tensile strength and tear resistance. Rubber compositions containing my pigments vulcanize in much the same manner as corresponding rubber compositions containing such inert pigments as barium sulfate and calcium carbonate. Further, the pigments so obtained in accordance with my invention are less sharp than silicic acid and silica pigments heretofore available and, hence, are superior for use in paints and the like. Furthermore, my pigments when used in paper coating slips produce a better finish than previously available silicic acid and silica products.

The alkali silicates which may be employed in accordance with my invention may be any of the water-soluble silicates of any of the alkali metals and particularly of sodium or potassium. Preferably I employ the more readily available sodium silicates. The alkali silicates with a low ratio of silica to alkali, such as equal mols, will usually be less desirable than the silicates containing larger proportions of silica since they require much larger quantities of acid for neutralization which increases the cost. If a meta silicate is used, the final product will be silicic acid with little or no free silica. Preferably I employ alkali silicates which contain from about 3 to about 3.5 mols of silica to each mol of alkali and, particularly, those which contain from about 3.3 to about 3.4 mols of silica to each mol of alkali. Usually, ordinary water glass, having a ratio of about 3.36 mols of silica to 1 mol of sodium oxide, will produce satisfactory results. When the alkali silicate contains silica in a ratio greater than 1 mol to each mol of alkali, then substantial proportions of the excess silica will be deposited as free silica and the rest of the silica will be deposited as silicic acid. Throughout the specification and claims, when I refer to ratios of alkali or other metal to silica, I include, as silica, that present in hydrated form as silicic acid or salt of silicic acid as well as that present as free silica.

The metal salts, to which the solution of alkali silicate may be added in accordance with my invention, consist of salts of the metals of series 3 to 8, inclusive, of group II of the periodic table, that is magnesium, calcium, zinc, strontium, cadmium and barium. These salts will be the salts of acids which form salts more soluble in water than the silicate of the metal. Particularly suitable metal salts include calcium sulfate, calcium acetate, barium chloride, zinc acetate, magnesium acetate, cadmium acetate, strontium acetate, and the like. The ratio of the metal salt employed may be varied within the range of from 1 mol of metal to from about 1 to about 13 mols of silica.

I have found that the ratio of the metal to silica has an effect on the properties of the pigment produced. For example, I have found that, if the metal salt is calcium sulfate, the tear resistance of a rubber composition containing the pigment will increase rapidly as the molar ratio of calcium to silica decreases from equal molar amounts to 1 of calcium to 6.8 of silica. As the proportion of calcium is further reduced beyond this proportion, the tear resistance imparted to a rubber composition begins to decrease. However, the final product is in the form of a fine powder and not gelatinous in nature when only 1 mol of calcium is present for 13 mols of silica and the resulting product is a good pigment for various purposes, although less desirable in rubber. Larger amounts of calcium or other metal salt may be employed but will usually be wasteful unless it is desired to produce a pigment containing such larger amounts of the metal salt. For the preparation of the preferred pigments for use in rubber, I preferably employ about 1 mol of metal to about 6.7 mols of silica.

The acid, which may be employed for the treatment of the slurry, may be any water-soluble acid which has a dissociation constant of at least $9.1 \times 10^{-8}$, or, in other words, any acid at least as strong as hydrogen sulfide. Preferably the acid will be at least as strong as acetic acid, which has a dissociation constant of $1.7 \times 10^{-5}$. Suitable acids include hydrogen sulfide, acetic acid, sulfuric acid, sulfurous acid, oxalic acid, hydrochloric acid, phosphoric acid, carbonic acid, and the like. Pigments, consisting essentially of silicic acid and silica, will usually produce the best results in rubber compositions. To produce such pigments, the metal salt employed will be one which is readily soluble in water, and the acid, employed for neutralization, will be one which will form with the metal a salt which is readily soluble in water, so that the final pigment will contain little or no solid metal salt and any such metal salt can be readily washed from the pigment with water. However, inert metal salts, such as calcium sulfate, barium sulfate, barium sulfite, magnesium hydrate, and calcium oxalate may be desirable in the pigment in order to improve the properties of the pigment in other respects, such as to give the pigment greater covering power in rubber, paint, or the like. Under such circumstances the acid employed for neutralizing the slurry will be one which will form with the metal the desired insoluble metal salt. Such metal salts, co-precipitated with the silica and silicic acid by the process of my invention, are generally precipitated in very fine particle size and are particularly desirable for such purposes.

The pigments of my invention will vary somewhat in properties with the final pH obtained by the treatment with the acid. The final pH also will depend upon the pH at which the silicate of the metal will decompose. The different metal silicates will decompose at different pH's, usually between 7.5 and 10. Calcium silicate appears to decompose at a pH of about 10. The acid must be added gradually to the slurry until the pH of the slurry is reduced to below 10 and below that at which the silicate of the metal employed will decompose to deposit silicic acid. The pH may be reduced to that of a strong acid, for example a pH of 2, and still produce the product in the form of a fine powder. Usually, however, the acid will be added until the pH of the slurry is reduced to from about 7 to about 8.5. Where it is desired to produce a pigment having the most desirable properties in the compounding of rubber, the final pH should be in the range of from about 7 to about 7.5.

My process is carried out in water as the reaction and suspending medium. For ease of operation, the water should be sufficient to form a fairly fluid slurry, usually 7 or more parts of water to each part of solid obtained. The process may be carried out at any temperature above the freezing point of the water and up to the boiling temperature of the aqueous solutions and suspensions. However, I prefer to employ temperatures above 50° C. and, particularly, of from about 70° C. to about 90° C. as the products obtained at such higher temperatures appear to have slightly better properties for use as compounding materials for rubber compositions.

Usually the pigment will be separated from the aqueous solution by filtration. However, it may be separated by other means, such as centrifuging and the like. It will also be generally desirable to wash the pigment with water to remove acid, alkali and water-soluble salts. The pigment may be dried in any suitable manner at a temperature below that at which it will be calcined. Temperatures between 100° C. and 200° C. may ordinarily be used but it will usually be preferred to dry the pigment at temperatures of from about 100° C. to about 130° C.

In order to more clearly illustrate my invention, preferred modes of carrying the same into effect and advantageous results obtained thereby, the following examples are given:

*Example I*

One hundred grams (1 mol) of finely ground limestone was slurried in four liters of water at 40° C. and treated with 20 percent sulfuric acid until the slurry was neutral. This required 95 grams of sulfuric acid. The resulting slurry of calcium sulfate was then heated to 75° C. and, while being well agitated, was treated with 40° Baumé commercial water glass having a silica/sodium oxide ratio of 3.36 to 1. One mol (680 grams) of water glass was added slowly, during about 25 minutes. During this time, the slurry continued to thicken. A second mol of water glass was then added more rapidly and the slurry became very thin and was held at 75° C. for about 15 minutes. The slurry was then treated with 20 percent sulfuric acid at the rate of about 100 cc. per minute until the pH was reduced to 8. Acid was then added very slowly until the pH had been reduced to 7.2. The slurry was filtered and the filter cake washed and finally dried at 120° C. The white friable dried cake weighed 625 grams and consists of a mixture of calcium sulfate, silica and silicic acid, with a ratio of about 6.7 mols of silica and silicic acid (calculated as silica) to 1 mol of calcium.

This pigment was tested in the following rubber compound in which the parts are by weight:

| | Parts |
|---|---|
| Smoked sheet | 100 |
| Zinc oxide | 5 |
| Sulfur | 3 |
| Stearic acid | 3 |
| Mercaptobenzothiazole | 1 |
| Pigment (25 volumes) | 52.5 |

This compound vulcanized at 260° F. to give exceptionally good tensile strength and tear resistance.

When employed in a hydrolyzed starch paper coating slip, good working qualities and finish were obtained.

*Example II*

One mol (176 grams) of calcium acetate was dissolved in 2 liters of water at 80° C. This solution was treated with 2 mols of 40° Baumé water glass diluted with 2 liters of water at 80° C. by adding the water glass during about 20 minutes and with good agitation. The slurry was held at 80° C. for 45 minutes and was then treated with 4 mols (240 grams) of acetic acid. The final pH was about 8.5 and the precipitate formed in the resulting slurry consisted of finely divided silica and silicic acid. The solid material was filtered from the calcium acetate solution, washed and dried. The yield was 450 grams of finely divided material which tends to cling together but crumbles readily.

When substituted in equivalent volume for the pigment in the rubber compound of Example I, even better tensile and tear resistance were obtained.

*Example III*

Various heavy metal salts and various acids were used to prepare finely divided pigments of the following compositions by the general method described in Example I, employing 1 mol of metal salt to 2 mols of 40° water glass corresponding to about 6.7 mols of silica. In the case of the hydrate diluents, the pH was kept high enough to prevent solution.

| Metal Salt | Acid | pH | Molar Composition of Pigment | Specific Gravity of Pigment |
|---|---|---|---|---|
| $BaCl_2$ | Sulfuric | 7.5 | $BaSO_4$, 3.36 $SiO_2$, 3.36 $H_2SiO_3$ | 2.80 |
| $BaCl_2$ | Sulfurous | 7.5 | $BaSO_3$, 3.36 $SiO_2$, 3.36 $H_2SiO_3$ | 2.48 |
| $BaCl_2$ | Phosphoric | 7.5 | $Ba_3(PO_4)_2$, 10 $SiO_2$, 10 $H_2SiO_3$ | 2.33 |
| $Zn(C_2H_3O_2)_2$ | Acetic | 8.0 | $Zn(OH)_2$, 3.36 $SiO_2$, 3.36 $H_2SiO_3$ | 2.16 |
| $Zn(C_2H_3O_2)_2$ | Phosphoric | 7.5 | $Zn_3(PO_4)_2$, 10 $SiO_2$, 10 $H_2SiO_3$ | 2.26 |
| $Mg(C_2H_3O_2)_2$ | Acetic | 8.0 | $Mg(OH)_2$, 3.36 $SiO_2$, 3.36 $H_2SiO_3$ | 1.98 |
| $Mg(C_2H_3O_2)_2$ | Phosphoric | 7.5 | $Mg_3(PO_4)_2$, 10 $SiO_2$, 10 $H_2SiO_3$ | 2.25 |
| $CaSO_4$ | Oxalic | 7.5 | $Ca(COO)_2$, 3.36 $SiO_2$, 3.36 $H_2SiO_3$ | 2.00 |
| $Cd(C_2H_3O_2)_2$ | Phosphoric | 7.5 | $Cd_3(PO_4)_2$, 10 $SiO_2$, 10 $H_2SiO_3$ | 2.36 |
| $Sr(C_2H_3O_2)_2$ | Phosphoric | 7.5 | $Sr_3(PO_4)_2$, 10 $SiO_2$, 10 $H_2SiO_3$ | 2.29 |

*Example IV*

One mol of calcium carbonate was converted to one mol of calcium sulfate in 3 liters of water by treatment with one mol of sulfuric acid. The slurry was heated to 70° C. and treated with 6.72 moles of sodium meta silicate dissolved in 3 liters of water, which was added with good agitation during about 30 minutes. After digesting at 70° C. for 20 minutes, the slurry was neutralized to a pH of 7 by the addition of sulfuric acid. The solid material which remained was filtered off and dried at 120° C. to a fine white powder. This product was substantially calcium sulfate and silicic acid in the ratio of 1 mol calcium sulfate to about 6.72 mols of silicic acid, a small proportion of the silicic acid probably being dehydrated during the drying. Precipitation of some of the same silicate with acid in the absence of calcium produced a gel which dried to hard lumps.

Silicic acid pigments produced according to Example II of the foregoing description inherently possess certain characteristics or properties determinable by special analyses or tests of the finished pigments and calculations from analytical data, as follows:

Free water content: Upon being dried completely at 105° C. or a higher temperature, the pigments contain no "free water" in the sense of water removable by heating them at 105° C. After being so dried, however, they pick up free water from the atmosphere. Under ordinary atmospheric conditions, the dried pigments naturally acquire and hold free water in amounts which vary with the atmospheric humidity but are always in the range of about 2 to 10% of the weight of the pigments. They stay at a free water content of less than 2% only when special precautions have been taken to isolate them from atmospheric moisture after they have been dried thoroughly.

Bound water content (i.e., water removable by calcination, after removal of the free water content at 105° C.): 4 to 8% by weight.

$SiO_2$ content: At least 90% by weight after the elimination of free water at 105° C.; in excess of 90% by weight on an anhydrous basis, i.e., after calcination to remove the bound water content.

Molar ratio of bound water to $SiO_2$: 1 $H_2O$ to 3 to 7 $SiO_2$ (by calculation from analyses showing the contents of bound water and $SiO_2$).

$Na_2O$ analyses: Less than 1%.

Surface area (measured by the Brunauer-Emmett-Teller Method, Journal American Chemical Society, vol. 60, page 309 (1938)): 70 to 200 square meters per gram.

Mean ultimate particle size (by calculation from surface area): 0.015 to 0.04 micron.

Form of pigment particles: Mostly clustered in aggregations or flocs exhibiting openings or porosity, as pictured by electron photomicrograph.

pH of finished pigment: reslurried in water: approximately 6 to 8.

It will be understood that the foregoing examples have been given for illustrative purposes solely and that my invention is not intended to be limited to the specific embodiments disclosed therein except as the appended claims may require. Many variations and modifications may be made in the metal salts, the acids, the alkali metal silicates, the temperatures, proportions and particular modes of carrying the process into effect, without departing from the spirit or scope of my invention.

The pigments produced in accordance with my invention are particularly useful as compounding agents for natural rubber and the various synthetic elastomers, such as chloroprene polymers, butadiene polymers, butene polymers, and the like. They are also particularly valuable pigments for use in paints, and as ingredients of paper coating slips, and the like.

The pigments produced according to Example II are capable of producing GR-S rubber (a butadiene-styrene polymer) having a tensile strength of at least 2440 pounds per square inch, through milling of the pigments with GR-S rubber compositions and vulcanization of the resulting mixtures.

I claim:

1. The process for preparing a finely divided silicic acid pigment which comprises forming a fluid aqueous slurry of a finely divided silicate of a metal from series 3 to 8 of group II of the periodic table; while agitating said slurry incorporating with it gradually a water-soluble acid having a dissociation constant of at least $9.1 \times 10^{-8}$ and which decomposes said silicate, until all the metal silicate contained in the slurry is decomposed and a finely divided filterable precipitate containing silicic acid is formed; and separating the precipitate from the mother liquor.

2. A process as described in claim 1 wherein the acid addition is continued until the pH of the slurry is reduced approximately to a value between pH 7 and pH 8.5.

3. The process for preparing a finely divided silicic acid pigment which comprises providing a fluid aqueous slurry of a finely divided silicate of a metal from series 3 to 8 of group II of the periodic table, said silicate containing more than one mol of silica per mol of said metal; adding gradually to said slurry a water soluble acid having a dissociation constant of at least $1.7 \times 10^{-5}$ and which decomposes said silicate and forms with said metal a salt that is substantially insoluble in water, until an amount of such acid sufficient to decompose all the metal silicate contained in the slurry has been added and a finely divided filterable precipitate containing silicic acid and an insoluble salt of said acid and said metal is formed; and then separating the precipitate from the mother liquor.

4. A pigment which is essentially a co-precipitated finely divided mixture of a complex of silicic acid and silica and a substantially water-insoluble salt of a metal from series 3 to 8 of group II of the periodic table, as produced by the process of claim 3.

5. A process for preparing a finely divided silicic acid pigment which comprises providing a fluid aqueous slurry of a finely divided calcium silicate, adding gradually to said slurry a water-soluble acid having a dissociation constant of at least $1.7 \times 10^{-5}$ and which decomposes said silicate, until an amount sufficient to decompose all the metal silicate contained in the slurry has been added and a finely divided filterable precipitate containing silicic acid is formed; and separating the precipitate from the mother liquor.

6. A process as described in claim 5 wherein said calcium silicate contains more than one mol of silica per mol of calcium and drying the precipitate formed to obtain a finely divided white product that contains silicic acid and silica.

7. A method of preparing a finely divided, white pigment product which comprises reacting a finely divided calcium silicate in an aqueous slurry with an acid that forms a substantially water-insoluble salt with calcium in an amount sufficient to decompose substantially all the calcium silicate, thereby forming a finely divided precipitate containing silica and a calcium salt of said acid, and separating and drying said precipitate.

8. A method of preparing a finely divided pigment product which comprises reacting a finely divided calcium silicate in an aqueous slurry with an amount of sulfuric acid sufficient to decompose substantially all the calcium silicate, thereby forming a finely divided precipitate containing calcium sulfate and silica, and separating and drying said precipitate.

9. The process for preparing a finely divided silicic acid pigment which comprises forming a fluid aqueous slurry of a finely divided silicate of an alkaline earth metal; adding sulfuric acid gradually to said slurry until an amount sufficient to decompose all the metal silicate contained in the slurry has been added and a finely divided filterable precipitate containing silicic acid is formed; and then separating the precipitate from the mother liquor.

10. A process for preparing a finely divided silicic acid pigment which comprises providing a fluid aqueous slurry of a finely divided calcium silicate, adding sulfuric acid gradually to said slurry until an amount sufficient to decompose all the metal silicate contained in the slurry has been added and a finely divided filterable precipitate consisting substantially entirely of a complex of silicic acid and silica and a calcium sulfate is formed; and separating said precipitate from the mother liquor.

11. The process for preparing finely divided silicic acid pigment, which comprises forming a fluid suspension of a finely divided silicate of a metal from series 3 to 8 of group II of the periodic table in an aqueous reaction medium and providing an excess of dissolved alkali metal silicate therein, the silicates in said suspension providing from more than 1 to about 13 mols of $SiO_2$ per mol of said group II metal therein; thereafter adding to said suspension an acid that decomposes the silicates contained therein, until the amount of acid added is at least sufficient to decompose completely the total amount of said silicates, thus decomposing said silicates into a finely divided filterable silicic acid precipitate; and separating and drying said precipitate.

12. The process for preparing a finely divided silicic acid pigment, which comprises adding an aqueous solution of an alkali metal silicate, in stoichiometric excess, to an aqueous solution of a salt of a metal from series 3 to 8 of group II of the periodic table, the addition being effected gradually at least until the amount of said silicate added is approximately stoichiometric to the amount of said metal in said salt solution, thus forming a fluid suspension of a fine precipitated silicate of said metal in an aqueous medium containing excess alkali metal silicate; thereafter adding to said suspension an acid that decomposes the silicates contained therein, until the amount of acid added is at least sufficient to decompose completely the total amount of said silicates, thus decomposing said silicates into a finely divided filterable silicic acid precipitate; and separating and drying said preciptate.

13. The process for preparing a finely divided silicic acid pigment, which comprises reacting an aqueous solution of an alkali metal silicate, in stoichiometric excess, with an aqueous solution of a calcium salt so as to form a fluid suspension of a fine precipitated calcium silicate in an aqueous medium containing excess alkali metal silicate, the silicates in said suspension providing from more than 1 to about 13 mols of $SiO_2$ per mol of calcium therein; thereafter adding to said suspension an acid that decomposes said silicates, until the amount of acid added is at least sufficient to decompose completely the total amount of said silicates; thus decomposing said silicates into a finely divided filterable silicic acid precipitate; and separating and drying said precipitate.

14. The process for preparing a finely divided silicic acid pigment, which comprises forming a fluid suspension of a finely divided silicate of a metal from series 3 to 8 of group II of the periodic table in an aqueous reaction medium and providing an excess of dissolved alkali metal silicate therein, the silicates in said suspension providing from more than 1 to about 13 mols of $SiO_2$ per mol of said group II metal therein; thereafter adding to said suspension an acid that decomposes the silicates contained therein and forms a substantially water-insoluble salt with said group II metal, until the amount of acid added is at least sufficient to decompose completely the total amount of said silicates, thus decomposing said silicates into a finely divided filterable silicic acid precipitate containing a substantially water-insoluble compound of said group II metal; and separating and drying said precipitate.

15. The process for preparing a finely divided silicic acid pigment, which comprises forming a fluid suspension of a finely divided calcium silicate in an aqueous reaction medium and providing an excess of dissolved alkali metal silicate therein, said alkali metal silicate containing about 3 to 3.5 mols of $SiO_2$ per mol of alkali metal oxide and the silicates in said suspension providing not more than about 13 mols of $SiO_2$ per mol of calcium therein; thereafter adding to said suspension an acid that decomposes said silicates, until the amount of acid added is at least sufficient to decompose completely the total amount of said silicates; thus decomposing said silicates into a finely divided filterable silicic acid precipitate; and separating and drying said precipitate.

16. The process for preparing a finely divided silicic acid pigment, which comprises forming a suspension of a finely divided calcium silicate in an aqueous reaction medium and providing an excess of dissolved alkali metal silicate therein, said alkali metal silicate containing about 3 to 3.5 mols of $SiO_2$ per mol of alkali metal oxide and the silicates in said suspension providing not more than about 13 mols of $SiO_2$ per mol of calcium therein; thereafter adding sulfuric acid to said suspension until the amount of acid added is at least sufficient to decompose completely the total amount of said silicates, thus decomposing said silicates into a finely divided filterable silicic acid precipitate containing a calcium sulfate; and separating and drying said precipitate.

17. A pigment which is essentially a co-precipitated finely divided mixture of a complex of silicic acid and silica and a calcium sulfate, which contains about 1 mol of calcium to about 6.7 mols of silica, as produced by the process of claim 16.

18. A process for preparing a finely divided silicic acid pigment which comprises providing a fluid aqueous slurry of a finely divided silicate of a metal from series 3 to 8 of group II of the periodic table, adding gradually to said slurry a water soluble acid having a dissociation constant of at least $1.7 \times 10^{-5}$ and which decomposes said silicate and forms a water soluble salt with said metal, in an amount sufficient to decompose substantially all the metal silicate contained in the slurry, thus forming in the aqueous medium a filterable precipitate of discrete finely divided particles containing silicic acid, and separating the precipitate from the reaction liquid.

19. A process for preparing a finely divided silicic acid pigment which comprises providing a fluid aqueous slurry of a finely divided silicate of a metal from series 3 to 8 of group II of the periodic table, adding gradually to said slurry a water soluble acid having a dissociation constant of at least $1.7 \times 10^{-5}$ and which decomposes said silicate and forms a water soluble salt with said metal, in an amount sufficient to decompose substantially all the metal silicate contained in the slurry, and bringing the pH of the slurry to a final value of from about 7 to about 8.5, thus forming in the aqueous medium a filterable precipitate of discrete finely divided particles containing silicic acid, and separating the precipitate from the reaction liquid.

20. A process for preparing a finely divided silicic acid pigment which comprises forming a fluid suspension of a precipitated finely divided silicate of a metal from series 3 to 8 of group II of the periodic table in an aqueous reaction medium, said silicate containing more than 1 mol of silica per mol of said metal, adding gradually to said suspension an acid that decomposes said silicate and forms a water soluble salt with said metal, until the amount of acid added is at least approximately stoichiometric to the metal content of all the silicate contained in the suspension, thus forming in the aqueous medium a filterable precipitate of discrete finely divided particles containing silicic acid, and separating said precipitate from the reaction liquid.

21. A process for preparing a finely divided silicic acid pigment which comprises adding an aqueous solution of an alkali metal silicate to an aqueous solution of a salt of a metal from series 3 to 8 of group II of the periodic table while thoroughly mixing in the silicate solution to avoid local concentrations thereof, thus forming a fluid aqueous slurry containing a precipitated finely divided silicate of said metal, said slurry providing from 1 to 13 mols of silica per mol of said metal, adding gradually to said slurry an acid that decomposes said precipitated silicate and forms a water soluble salt with said metal, in an amount at least approximately stoichiometric to the metal content of all the silicate contained in the slurry, thus decomposing said silicate and forming in the aqueous medium a filterable precipitate of discrete finely divided particles containing silicic acid, and separating said precipitate from the reaction liquid.

22. A process for preparing a finely divided silicic acid pigment which comprises adding gradually to a fluid aqueous slurry of a precipitated finely divided calcium silicate an acid that decomposes said silicate and forms a water soluble salt with calcium, in an amount sufficient to decompose substantially all of said silicate, thus forming in the aqueous medium a filterable precipitate of discrete finely divided particles containing silicic acid, and separating said precipitate from the reaction liquid.

23. A process for preparing a finely divided silicic acid pigment which comprises adding gradually to a fluid aqueous slurry of a precipitated finely divided calcium silicate an acid that decomposes said silicate and forms a water soluble salt with calcium, in an amount sufficient to decompose substantially all of said silicate, and bringing the pH of the slurry to a final value of from about 7 to about 8.5, thus forming in the aqueous medium a filterable precipitate of discrete finely divided particles containing silicic acid, and separating said precipitate from the reaction liquid.

24. A process for preparing a finely divided silicic acid pigment which comprises adding gradually to a fluid aqueous slurry of a precipitated finely divided calcium silicate acetic acid in an amount at least approximately stoichiometric to the metal content of all the silicate contained in the slurry and sufficient to bring the slurry to a pH value below 8.5, thus forming in the aqueous medium a filterable precipitate of discrete finely divided particles containing silicic acid, and separating said precipitate from the reaction liquid.

25. A process for preparing a finely divided silicic acid pigment which comprises adding gradually to a fluid aqueous slurry of a precipitated finely divided calcium silicate hydrochloric acid in an amount at least approximately stoichiometric to the metal content of all the silicate contained in the slurry and sufficient to bring the slurry to a pH value below 8.5, thus forming in the aqueous medium a filterable precipitate of discrete finely divided particles containing silicic acid, and separating said precipitate from the reaction liquid.

26. A process for preparing a finely divided silicic acid pigment which comprises adding an aqueous solution of sodium silicate containing from 3 to 3.5 mols of silica per mol of $Na_2O$ to an aqueous solution of a calcium salt while thoroughly mixing in the silicate solution to avoid local concentrations thereof, thus forming a fluid aqueous slurry containing a precipitated finely divided calcium silicate, adding gradually to said slurry an acid that decomposes said silicate and forms a water soluble salt with calcium, in an amount at least approximately stoichiometric to the metal content of all the silicate contained in the slurry, thus forming in the aqueous medium a filterable precipitate of discrete finely divided particles containing silicic acid, and separating said precipitate from the reaction liquid.

References Cited in the file of this patent

UNITED STATES PATENTS

| | | |
|---|---|---|
| 2,204,113 | Allen | June 11, 1940 |
| 2,237,374 | Smith | Apr. 8, 1941 |
| 2,259,481 | Mowlds | Oct. 21, 1941 |
| 2,287,700 | Muskat et al. | June 23, 1942 |
| 2,314,188 | Allen | Mar. 16, 1943 |
| 2,805,955 | Allen | Sept. 10, 1957 |
| 2,806,012 | Allen | Sept. 28, 1957 |

OTHER REFERENCES

Dana: Manual of Mineralogy, 14 Edition (1929), pages 116, 117 and 250.